US012511678B2

(12) United States Patent
Roth et al.

(10) Patent No.: US 12,511,678 B2
(45) Date of Patent: Dec. 30, 2025

(54) APPARATUS, SYSTEM AND METHODS OF PRODUCING ON-DEMAND, PERSONALIZED, SINGLE-SERVE FOOD BARS

(71) Applicants: BarTendr Ventures, LLC, Denver, CO (US); David Roth, West Vancouver (CA); Rick Bacher, West Vancouver (CA)

(72) Inventors: David Roth, West Vancouver (CA); Rick Bacher, West Vancouver (CA)

(73) Assignee: BarTendr Ventures, LLC, Denver, CO (US)

(*) Notice: Subject to any disclaimer, the term of this patent is extended or adjusted under 35 U.S.C. 154(b) by 35 days.

(21) Appl. No.: 18/284,669

(22) PCT Filed: Sep. 27, 2022

(86) PCT No.: PCT/US2022/044910
§ 371 (c)(1),
(2) Date: Sep. 28, 2023

(87) PCT Pub. No.: WO2023/196008
PCT Pub. Date: Oct. 12, 2023

(65) Prior Publication Data
US 2025/0095043 A1    Mar. 20, 2025

Related U.S. Application Data

(60) Provisional application No. 63/249,422, filed on Sep. 28, 2021.

(51) Int. Cl.
G06Q 30/0601    (2023.01)
A23P 30/10       (2016.01)
G06Q 10/087     (2023.01)

(52) U.S. Cl.
CPC .......... *G06Q 30/0621* (2013.01); *A23P 30/10* (2016.08); *G06Q 10/087* (2013.01)

(58) Field of Classification Search
CPC .... A47J 36/32; A47J 36/321; G06Q 30/0202; A23P 30/00; A23P 30/10
USPC ......................................... 426/394; 700/231
See application file for complete search history.

(56) References Cited

U.S. PATENT DOCUMENTS

| 10,143,229 | B2* | 12/2018 | Mantry | A23P 30/10 |
| 12,019,427 | B2* | 6/2024 | Bippert | G06Q 30/0202 |
| 2007/0005185 | A1* | 1/2007 | Roth | A47G 21/181 |
| | | | | 700/231 |
| 2016/0058065 | A1* | 3/2016 | Mantry | A23P 30/00 |
| | | | | 425/200 |
| 2017/0253413 | A1* | 9/2017 | Mantry | B65D 81/34 |
| 2018/0127192 | A1* | 5/2018 | Cohen | G07F 11/68 |
| 2019/0246683 | A1* | 8/2019 | Mantry | A23P 30/10 |
| 2021/0100396 | A1* | 4/2021 | Cohen | B65D 77/04 |
| 2021/0106041 | A1* | 4/2021 | Mantry | A23P 30/00 |

(Continued)

*Primary Examiner* — Olusegun Goyea
(74) *Attorney, Agent, or Firm* — Whitestone Law, PLLC

(57) ABSTRACT

The disclosure relates to an apparatus, systems, and methods of producing on-demand, personalized, single-serve food bars. Specifically, the disclosure relates to systems and methods of selecting, ordering, assembling, and delivering single-portion ingredient blend cartridges for forming a personalized, single-serve food bar in a dedicated apparatus that operates in a semi-automatic manner.

17 Claims, 5 Drawing Sheets

(56) References Cited

U.S. PATENT DOCUMENTS

2021/0107724 A1* 4/2021 Cohen ................... A47J 36/321
2022/0338525 A1* 10/2022 Benesh ................... A23L 7/126

* cited by examiner

Wellness Priorities:
ENERGY/VITALITY
EXERCISE PREP/RECOVERY
FOCUS/CLARITY
GUT HEALTH/DIGESTION
HEART HEALTH
IMMUNITY
INFLAMMATION
PREGNANCY
REST/CALM
WEIGHT MANAGEMENT

Grains
Amaranth
Barley
Brown rice
Buckwheat
Millet
Oats
Quinoa
Rye
Teff

Nuts
Almonds
Brazil nuts
Peanuts
Pecans
Pistachios
Walnuts

Flavorings
Carob
Chamomile
Cinnamon
Cocoa
Coconut
Coffee
Ginger
Lemon
Mint

Dried Fruits
Acai
Apples
Apricots
Bananas
Blueberries
Cranberries
Dates
Goji berries
Mangoes
Raisins
Strawberries

Seeds
Chia
Flax
Hemp
Pumpkin
Sesame
Sunflower

Boosts
Energy
Fiber
Probiotics
Protein

Dietary Preferences:
☐ GLUTEN FREE
☐ LOW SODIUM
☐ NON DAIRY
☐ NUT FREE
☐ SUGAR FREE
☐ KOSHER

Texture Preference:
☐ CHEWY
☐ CRUNCHY

FIG. 4A

APPARATUS, SYSTEM AND METHODS OF PRODUCING ON-DEMAND, PERSONALIZED, SINGLE-SERVE FOOD BARS

COPYRIGHT NOTICE

A portion of the disclosure hereinbelow contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND

The disclosure is directed to an apparatus, systems, and methods of producing on-demand, personalized, single-serve food bars. Specifically, to systems and methods of selecting, ordering, assembling, and delivering single-portion ingredient cartridges for forming a personalized, single-serve food bar in a dedicated apparatus that operates in a semi-automatic manner.

The portability, variety and availability of packaged energy, snack and nutrition bars appeal to on-the-go adults, heads-of-households, students, fitness enthusiasts and athletes, travelers, and many others. It is a fast-growing and dynamic category within the consumer-packaged goods (CPG) industry.

Various CPG brands offer a wide array of such ready-to-eat bars, all produced and packaged in bulk at their facilities and sold through multiple retail channels. Consumers of such packaged food bars are presented with hundreds of options to select from in often crowded shelf displays at retail settings, with product labeling or point-of-sale signage highlighting key features and benefits.

As consumers become increasingly educated and discerning about their food choices, bar manufacturers rush to market with innovative ready-to-eat offerings. Such offerings are meant to appeal to these consumers' distinct preferences around flavor, texture, portion size, calorie count, type of sweetener, nutritional benefits, functional benefits, allergies or sensitivities, dietary restrictions, clean-label, and price-point.

Given the limitations of considering all their preferences when selecting from packaged bars, most consumers are forced to sacrifice many of their priorities.

One approach that consumers take to combatting such preference sacrifice is to attempt to prepare fresh versions of packaged foods at home. The challenge with this approach, especially in the bar category, is that fresh bar recipes are typically labor and time intensive, require unconventional ingredients and precise formulations, and result in a full batch, rather than a single bar.

Another popular approach consumers take to address their preferences more fully and reliably is to rely on technology-enabled food preparation systems. For example, single-serve coffee brewing systems such as KEURICG® or NESPRESSO® and water carbonation systems such as SODASTREAM®, allow for a certain amount of flavor and portioning control, are prepared in rapid fashion, and utilize a pre-packaged, professionally formulated ingredient component. Such systems have become ubiquitous in home kitchens. They are also commonly found in food service, lodging, and office establishments, and various travel and entertainment venues. These systems employ some form of a pod- or cartridge-based apparatus that allows for rapid production of a product that appeals to some or most of the user's preferences.

SUMMARY OF THE DISCLOSURE

These two trends pave the way for a third and more reliable approach in the bar category: A fully integrated, single-serve networked bar making system that allows for a high degree of ingredient, texture and portioning specification, rapid and on-demand production in a dedicated apparatus, consistent quality, and ultimate freshness and portability.

The disclosure addresses this approach.

Disclosed, in various exemplary implementations, are systems and methods of selecting, ordering, assembling, and delivering single-serve ingredient blend cartridges for forming a personalized, single-serve food bar in a semi-automatic manner.

In an exemplary implementation, provided herein is a system for selecting a personalized, single-serve food bar formulation for a user comprising: a multi-phased user interface featuring a sequenced series of prompts that ascertain a user's preferences for any of the following: flavor, texture, portion size, calorie count, type of sweetener, specific ingredients, binder flavors, nutritional benefits, functional benefits, food allergies or sensitivities, and dietary restrictions; descriptive information on the taste profiles, specific attributes, and health and wellness benefits of individual ingredients; examples of pre-set ingredient and flavored binder blend options that closely match a user's indicated preferences presented as a custom blend or as a third-party branded blend; instructions for a user to create a personalized blend of ingredients and flavored binder based on indicated preferences or new information derived from the descriptive information; detailed prompts about quantities requested and preferred methods of delivery.

In an exemplary implementation, provided herein is a system for ordering a personalized, single-serve food bar formulation for a user comprising: a plurality of food bar formulations; a first inventory system comprising a plurality of cartridges, each cartridge corresponding to a pre-set food bar formulation; a second inventory system comprising a plurality of ingredients, custom-configured when combined to form the personalized, single-serve food bar; a third inventory system comprising a plurality of third-party branded recipe cartridges, each cartridge corresponding to a predetermined food bar formulation; selecting at least one of: a custom-formulated food bar from the second inventory system, and a pre-formulated food bar from at least one of: the first inventory system, and the third inventory system.

In an exemplary implementation, provided herein is a computerized networked system for ordering a personalized, single-serve food bar formulation for a user comprising: a backend networked management server (BNMS); a database comprising a plurality of food bar formulations in communication with the BNMS; a first inventory system comprising a plurality of cartridges, each cartridge corresponding to a pre-set food bar formulation in the database in communication with the BNMS; a second inventory system comprising a plurality of ingredients, custom-configured when combined to form the personalized, single-serve food bar; a third inventory system comprising a plurality of third-party branded recipe cartridges, each cartridge corresponding to a predetermined food bar formulation in communication with the BNMS; a networked computing device, in communication with the BNMS, the networked computing device further comprising at least one processor operably coupled to a non-transitory memory device storing thereon a computer-readable medium with a set of executable instructions, configured when executed to cause the at least one processor to form the steps of: contacting the BNMS; selecting at least one of: a custom-formulated food bar from the second inventory system, and a pre-formulated food bar from at least one of: the first inventory system, and the third inventory system.

In another exemplary implementation, the apparatus included in the system comprises: a housing having a front opening a chamber within the housing, accessible through the front opening; a motorized lever, operable to reciprocally translate vertically at a predetermined rate; a chuck having a cavity sized and configured to accommodate a removable mold, operably coupled to the motorized lever, wherein the chuck is operable to be temperature programmable; the mold, having an open apical end, sized and adapted to accommodate the cartridge, or the ingredient combination; a motorized plunger, having a base plate, operable to reciprocally translate vertically at a predetermined rate, the base plate sized and configured to be accommodated in the open apical end of the mold, wherein the plunger is operable to partially penetrate the mold to a predetermined depth; a motorized ejector, operable to reciprocally translate horizontally at a predetermined rate; a motor, in electric communication with the motorized lever, the motorized plunger and the motorized ejector; a user interface; the chuck, and the motor, further comprising receiving a set of operating instructions from the user interface; and using the set operating instructions, actuating the motor to selectably control each of: the motorized lever, the motorized plunger, and the motorized ejector.

In another exemplary implementation, the apparatus included in the system comprises: a housing having a front opening a chamber within the housing, accessible through the front opening; a motorized lever, operable to reciprocally translate vertically at a predetermined rate; a chuck having a cavity sized and configured to accommodate a removable mold, operably coupled to the motorized lever, wherein the chuck is operable to be temperature programmable; the mold, having an open apical end, sized and adapted to accommodate the cartridge, or the ingredient combination; a motorized plunger, having a base plate, operable to reciprocally translate vertically at a predetermined rate, the base plate sized and configured to be accommodated in the open apical end of the mold, wherein the plunger is operable to partially penetrate the mold to a predetermined depth; a motorized ejector, operable to reciprocally translate horizontally at a predetermined rate; a motor, in electric communication with the motorized lever, the motorized plunger and the motorized ejector; a graphic user interface; and a central processing module (CPM) in communication with the graphic user interface, the chuck, and the motor, the CPM further comprising at least one processor operably coupled to a non-transitory memory device storing thereon a computer-readable medium with a set of executable instructions, configured when executed to cause the at least one processor to: receive a set of operating instructions from the user interface; and using the set operating instructions, actuating the motor to selectably control each of: the motorized lever, the motorized plunger, and the motorized ejector.

In yet another exemplary implementation, the system further comprises: upon selection of the custom-formulated ingredient combination, provide a list of ingredients; receive at least one ingredient combination; for the at least one ingredient combination, generate the set of operating instructions; and deliver the set of operating instructions to the system in order to create the custom-formulated ingredient bar.

In yet another exemplary implementation, the BNMS included with the system further comprises at least one processor operably coupled to a non-transitory memory device storing thereon a computer-readable medium with a set of executable instructions, configured when executed to cause the at least one processor to: upon selection of the custom-formulated ingredient combination by the networked computing device, provide to the networked computing device a list of ingredients; receive from the networked computing device at least one ingredient combination; for the at least one ingredient combination, generate the set of operating instructions; and deliver the set of operating instructions to at least one of: the communication module of the apparatus, and the networked computing device.

In another exemplary implementation, provided herein is a method of ordering and forming a personalized, single-serve food bar, implementable in the systems disclosed, the method comprising: selecting at least one of: the cartridges from the first inventory system, the plurality of ingredient combinations from the second inventory system, and a third inventory system comprising a plurality of third-party branded recipe cartridges, each cartridge corresponding to a predetermined food bar formulation; upon receipt, placing one of: the cartridges from the first inventory system, the cartridges of ingredient combinations from the second inventory system, or the cartridges of the third inventory system, into the mold; and then using operating instructions, forming the personalized, single-serve food bar.

In another exemplary implementation, provided herein is a computerized method of ordering and forming a personalized, single-serve food bar, implementable in the systems disclosed, the method comprising: using the networked computing device contacting the BNMS; selecting at least one of: the cartridges from the first inventory system, the plurality of ingredient combinations from the second inventory system, and a third inventory system comprising a plurality of third-party branded recipe cartridges, each cartridge corresponding to a predetermined food bar formulation; upon receipt, placing one of: the cartridges from the first inventory system, the cartridges of ingredient combinations from the second inventory system, or the cartridges of the third inventory system, into the mold; and using the operating instructions, forming the personalized, single-serve food bar.

In yet another exemplary implementation, provided herein is a system for selecting and ordering a personalized, single-serve food bar formulation for a user comprising: a plurality of food bar formulations; a first inventory system comprising a plurality of cartridges, each cartridge corresponding to a food bar formulation; selecting at least one food bar formulation ordering at least one of the selected food bar formulations.

In yet another exemplary implementation, provided herein is a computerized networked system for selecting and ordering a personalized, single-serve food bar formulation for a user comprising: a backend networked management server (BNMS); a database comprising a plurality of food bar formulations in communication with the BNMS; a first inventory system comprising a plurality of cartridges, each cartridge corresponding to a food bar formulation in the database in communication with the BNMS; a networked computing device, in communication with the BNMS, the networked computing device further comprising at least one processor operably coupled to a non-transitory memory device storing thereon a computer-readable medium with a set of executable instructions, configured when executed to cause the at least one processor to form the steps of: contacting the BNMS; selecting at least one food bar formulation ordering at least one of the selected food bars formulation.

BRIEF DESCRIPTION OF THE FIGURES

A better understanding of the system and methods of selecting, ordering, assembling, and delivering single-portion ingredient blend cartridges for forming a personalized, single-serve food bar in a semi-automatic manner, with regard to the exemplary implementations, thereof, reference is made to the accompanying drawings, in which like numerals designate corresponding elements or sections throughout and in which.

DETAILED DESCRIPTION

In several exemplary implementations, provided herein are systems and methods implementable on these systems, of selecting, ordering, assembling, and delivering single-portion ingredient blend cartridges for forming a personalized, single-serve food bar in a semi-automatic manner. The term "system" shall be taken to include any collection of systems or sub-systems that individually or jointly execute a set, or multiple sets, of instructions to perform one or more functions. Also, the term "system" refers to a logical assembly arrangement of multiple devices and is not restricted to an arrangement wherein all the component devices are in the same housing.

In the context of the disclosure, the term "personalized" means an action or selection that has undergone such a selection process such that the selected product may have an enhanced value to a particular user, and is designed or calculated with specific individualized parameters from that user. Furthermore, in the context of the disclosure, the term "food bar" refers to a food product having a massive shape which is portable and can be eaten by hand, no limit being set as to the choice of the shape or ingredients, which can be for example, a bar as well as a stick, a ball, a heart, a star, an animal or a fruit.

Moreover, in the context of the disclosure, the term "cartridge" shall be taken to include any type of food-grade packaging vessel that can be used for single-portion containment of ingredients, placement within the bar forming apparatus, and subsequent storage or transport of the formed bar. These may include wrappers, pods or filters made from a variety of materials, including plant-based and other bio-degradable substances.

In an exemplary implementation, provided herein is a process for creating a personalized, single-serve food bar in a dedicated countertop appliance (apparatus) or automated vending device that applies a pre-programmed application of specific, predetermined regimen of heat and pressure to a self-contained blend of certain particulate ingredients and a either solid and/or liquid binding agent that forms it into a ready-to-eat food bar, typically in less than five minutes, for example, in between about 2 minutes and about 5 minutes, depending on size and ingredients.

Figure 1:
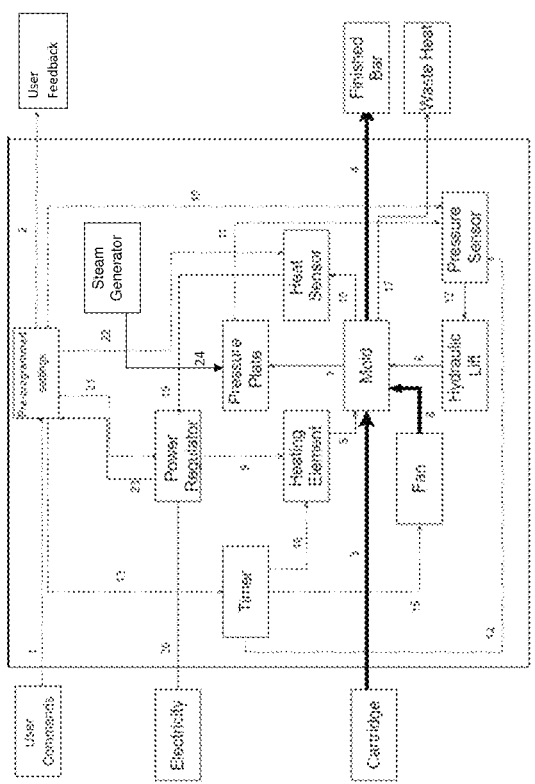
FIG. 1, is a schematic representation of an exemplary implementation of the apparatus architecture used in the systems disclosed.
Figure 3:
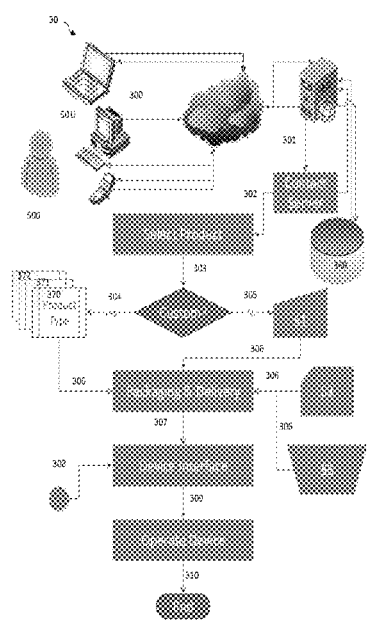
FIG. 3, is a schematic representation of an exemplary implementation of the ordering system disclosed.

For example and in an exemplary implementation illustrated partially in FIGS. 1, and 3; the process begins with the user 500 engaging 300 with an online ordering process 301 to learn about and select specific bar blends 302, which comprise a variety of particulate ingredients such as grains, nuts, fruits, seeds, and functional boosts, combined with a binding agent. Selections can be sorted by ingredient and/or flavor preferences, as well as functional wellness or nutritional attributes, texture preferences, portion sizes and customer popularity. Additional options are provided by a backend management server, to choose 303 from a variety of custom blends that meet the user's selection criteria or to have a customized blend prepared. The blends are placed in individually portioned packaging and delivered 306 to the user on a one-time (in other words, per online order) or recurring basis (in other words, subscription-based). Alternatively, users can select 305 from a variety of individually portioned custom or co-branded blends at certain third-party retail venues, whether online, or in a brick-and-mortar facility.

Figure 4B:
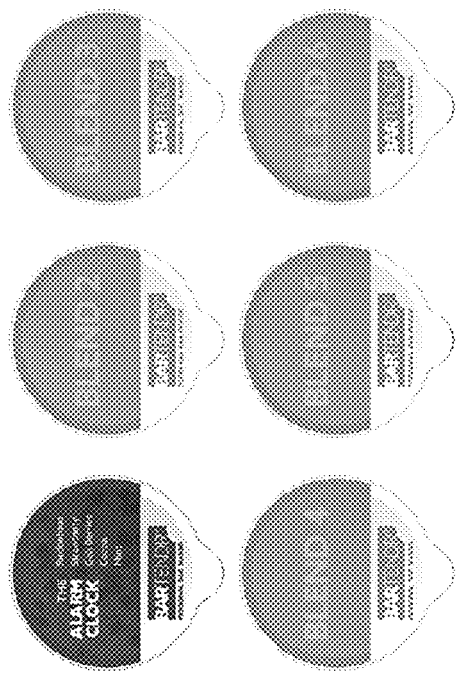
FIG. 4A illustrates an example of the ordering system's interface screen, with FIG. 4B, showing a choice implementation example when selecting an item from the screen of FIG. 4A.

In another exemplary implementation, consumer will select and order individual ingredients and make their own combination. The appliance (interchangeable with apparatus) can either be pre-programmed 1 (see e.g., FIG. 1) to operate at a predetermined rate of heat and pressure for each blend, which is identified on the blend packaging, or using a user interface, be programmed by the user. To begin the operation of making the bar, the user plugs in and turns on the dedicated appliance. The user engages with the appliance interface to specify the prescribed operating program, as specified on the selected blend packaging. The user opens the door of the appliance and places the cartridge and/or dispenses individually portioned blend contents, into a disposable or reusable container that fits into a specific component of the appliance (see e.g., FIG. 4B).

Figure 2:
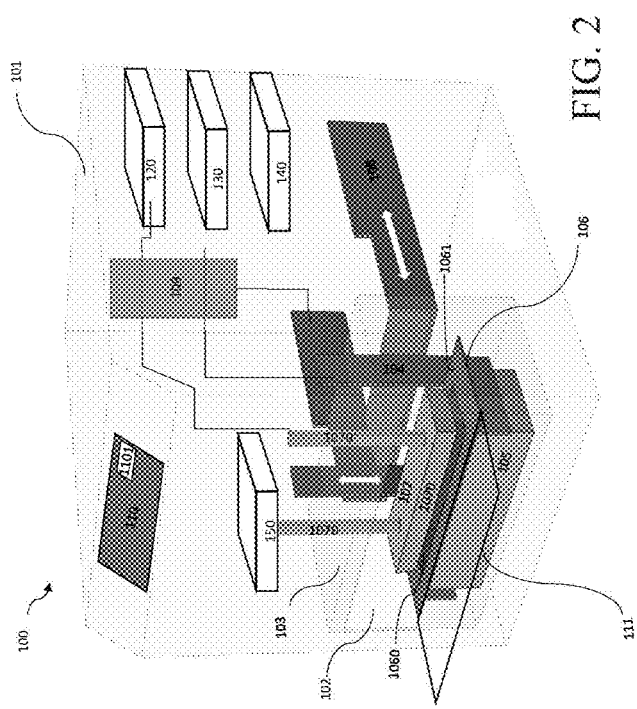
FIG. 2, is a schematic representation of the apparatus architecture illustrated in FIG. 1.

As illustrated in FIGS. 1 and 2, the appliance comprises (see e.g., FIG. 2): housing 101 having front opening 102, with door 111 coupled along a hinge to the opening and configured to transition between an open position and closed position covering front opening 102, with chamber 103 within housing 101, accessible through front opening 102; motorized lever 104, operable to reciprocally translate vertically at predetermined rate. Also illustrated, is temperature programmable chuck 105, chuck having cavity 1050 (not shown) sized and configured to accommodate removable mold 106, operably coupled to motorized lever 104, wherein temperature programmable chuck 105 is operable to be temperature programmable; removable mold 106, can be made in certain exemplary implementation, from resilient material, such as silicon, PDMS, and other heat-stable polymers, having open apical end 1060, sized and adapted to accommodate cartridge 400 (not shown), or ingredient combination, whether in bulk directly in the mold, or in dedicated packaging 450 (not shown). Motorized plunger 107 is also shown, having base plate 1070, operable to reciprocally translate vertically at predetermined rate, whereby base plate 107 is sized and configured to be accommodated in open apical end 1060 of removable mold 106, wherein motorized plunger 107, is operable to partially penetrate removable mold 106 to predetermined depth. Likewise, apparatus 10 further comprises motorized ejector 108, operable to reciprocally translate horizontally at predetermined rate, whereby at the end of bar preparation, motorized ejector is operable to push temp. programmable chuck 105 through the from front opening 102 of chamber 103, such that removable mold 106 can be removed from cavity 1050 defined in temp. programmable chuck 105 and the formed bar 800 (not shown) and its packaging 450, or cartridge 400, can be removed. Motor 109, being in electric communication with motorized lever 104, motorized plunger 107 and motorized ejector 108 user interface 110 is illustrated; and central processing module (CPM) 120 in communication with user interface, chuck, and motor, is also shown, whereby CPM further comprising at least one processor operably coupled to non-transitory memory device storing thereon computer-readable medium with set of executable instructions, configured when executed to cause at least one processor to: receive set of operating instructions from user interface 110; and using set operating instructions, actuating motor 109 to selectably control each of: motorized lever 104, motorized plunger 107, and motorized ejector 108.

For example, and in certain implementations, when motorized plunger 107 reaches a certain position (in other words, retracted from removable mold 106 completely), at its uppermost position, CPM 120 contacts motorized lever and lifts removable mold 106 from cavity 1050 in chuck 105 along with it. In certain implementations, motorized lever can be C shaped, lifting removable mold 106 and flange 1061 on 3 sides. Thereafter, motorized ejector 108 slides forward, under removable mold 106, and abutting back of removable mold 106 at its upper flange 1061. Motorized ejector 108 continues to slide forward, in an anterior direction, sliding removable mold 106 off of motorized lever 104. Door 111 opens, and the process is complete.

Conversely, to start forming a new bar, removable mold 106 +ingredients is placed into motorized ejector with locating features, and the above process is reversed.

In an exemplary implementation, base plate 1070 of the motorized plunger 107, used in the systems and methods disclosed is operable to deliver liquid into the removable mold 106 open apical end 1060, and wherein the apparatus further comprises at least one liquid source 150, in fluid communication with motorized plunger's 107 base plate 1070. The liquid can be for example, steam, or compressed gas, such as, for example, liquid nitrogen, liquid oxygen, or liquid CO2. Other cooling liquids are also contemplated, as are heating fluids. Base plate 1070 may further comprise a plurality of needles operable to deliver the amount and type of liquid by, in certain exemplary implementations, penetrating the cartridges and/or any packaging material, and assisting in either heating, cooling, or binding the granular material.

Furthermore, apparatus 100 may further comprise networked communication module 130, in communication with the BNMS (see e.g., 350, FIG. 3) and the CPM.

Accordingly and as illustrated partially in FIGS. 2-4B, provided herein is a computerized networked system for ordering a personalized, single-serve food bar formulation for user 500 comprising: a backend networked management server (BNMS) 350; database 360 comprising a plurality of food bar formulations (See e.g., FIG. 4A), database 360 in two-way communication with BNMS 350; a first inventory system 370 comprising a plurality of cartridges (see e.g., FIG. 4B), each cartridge corresponding to a food bar formulation in database 360, in communication with BNMS 360; a second inventory system 371 comprising a plurality of ingredients, configured when combined to form the personalized, single-serve food bar; optionally, a third inventory system for assembling custom ingredients selected by user 500, packaging the ingredient combination and generating operating instructions for apparatus 100. Also illustrated are a plurality of networked suppliers (S1-S3), each supplier having (in other words, capable of supplying) a plurality of cartridges, each cartridge corresponding to a predetermined food bar formulation, in communication with the BNMS 360; a networked computing device 501$i$, in communication with the BNMS 360, the networked computing device 501$i$ further comprising at least one processor operably coupled to a non-transitory memory device storing thereon a computer-readable medium with a set of executable instructions, configured when executed to cause the at least one processor to form the steps of: contacting 301 the BNMS 360; selecting 302 at least one of: a custom-formulated food bar from the second inventory system, and a pre-formulated food bar from at least one of: the first inventory system, and a third inventory system. As further noted, the BNMS 360 further comprising at least one processor operably coupled to a non-transitory memory device storing thereon a computer-readable medium with a set of executable instructions, configured when executed to cause the at least one processor to: upon selection 304 of the custom-formulated food bar by the networked computing device, provide to the networked computing device 501$i$ a list of ingredients; receive from the networked computing device 501$i$ at least one ingredient combination; for the at least one ingredient combination, package the at least one ingredient combination, generate the set of operating instructions; and deliver the set of operating instructions to at least one of: the communication module 130 of the apparatus 10, and the networked computing device 501$i$ (for manual input using user interface 110). Additional sensor module 140, is also in communication with CPM 120, and is in communication with various temperature and pressure sensors disposed in the components of apparatus 100.

Furthermore, each of the cartridges from the first inventory system, the plurality of ingredients' combination from the second inventory system, and each of the cartridges of the third inventory system comprises the set of operating instructions, which can be encoded in a readable format, and wherein the user interface 110 further comprises a code reader 1101, operable to load the set of operating instruction to the CPM. These can be for example, encoded in a barcode, QR code and the like. Accordingly and in an exemplary implementation, the set of executable instructions stored in the non-transitory memory device operably coupled to the at least one processor included with the apparatus CPM 120, are further configured, when executed to cause the at least one microprocessor to: receive the set of operating instructions from the BNMS 360 (if transmitted to communication module 130), or from user interface 110, whether manually or through reader 1101; and using that set operating instructions, actuating motor 109 to selectably control each of: the motorized lever 104, the motorized plunger 107, and motorized ejector 108.

Inter-alia, the set of operating instructions comprises: a temperature profile (ramp up, residence time, at each temp., ramp down, and the like), to be programmed into the chuck, and/or the predetermined rate and period (where position would be the product of the rate and period) for upward translation of motorized lever 104, the residence time at an apical (topmost) position, and the predetermined rate and period for downward translation of the motorized lever, and/or the predetermined rate and period for downward translation of motorized plunger 107, the residence time at a basal (lowest) position, and the predetermined rate and period for upward translation of the motorized plunger, and/or the predetermined rate and period for anterior translation of motorized ejector 108, the residence time at a forward-most position (e.g., to remove removable mold 106, and the predetermined rate and period for posterior (in other words, backward) translation of motorized ejector 108.

In an exemplary implementation, the methods disclosed are implemented in the computerized systems disclosed. Accordingly, provided herein is a computerized method of ordering and forming a personalized, single-serve food bar, implementable in the exemplary implementations of system 10 provided herein, the method comprising: using the networked computing device contacting 301 the BNMS 360: selecting 302 the cartridges from the first inventory system 370, and/or the plurality of ingredients' combination from the second inventory system 371, and/or the cartridges of the third inventory system S1-S3; upon receipt, placing one of: the cartridges from the first inventory system, the ingredients' combination from the second inventory system, or the cartridges of the third inventory system, into open apical end 1060 of removable mold 106; and using the operating instructions, forming the personalized, single-serve food bar. The open apical end 1060 includes a lip of a container and a silicone tray, and the open apical end 1060 can be made from a mold. Removable mold 106 can be made of silicone.

The term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time. In an exemplary implementation, an electronic control unit of the systems disclosed and claimed, is the processing module.

Also, the term "communicate" (and its derivatives e.g., a first component "communicates with" or "is in communication with" a second component) and grammatical variations thereof are used to indicate a structural, functional, mechanical, electrical, optical, or fluidic relationship, or any combination thereof, between two or more components or elements. As such, the fact that one component is said to communicate with a second component is not intended to exclude the possibility that additional components can be present between, and/or operatively associated or engaged with, the first and second components. Furthermore, the term "electronic communication" means that one or more components of the systems for forming single serve food bars in a relatively short timeframe described herein, are in wired or wireless communication or internet communication so that electronic signals and information can be exchanged between the components.

The temp.-programmable chuck module can be heated using heating means operably coupled to some or all of the independently movable walls or facets. For example, the wall(s) or facet(s) can be a resistor to an electric current coupled to a variable current source, or in another example, be operably coupled to a heating element, or be double jacketed and be in fluid communication with a heating liquid (e.g., oil, steam). In addition, the molding module can be operably coupled to means for cooling.

The pressure applied using the actuators described herein, can be varied along the timeline after achieving the consolidation point (Tc) and be reduced or increased in a predetermined manner to maintain a specific, predetermined bulk density of the finished, single-serve edible bar.

In an exemplary implementation, when referring to "relatively short timeframe", the methods provided, implemented in the systems described are configured to provide a personalized, single-serve food bar at a timeframe of between about 1 min. and about 15 min.

In the context of the disclosure, the term "operable" means the system and/or the device and/or the program, or a certain element or step is fully functional, sized, adapted and calibrated, comprises elements for, and meets applicable operability requirements to perform a recited function when activated, coupled, implemented, actuated, effected, realized, or when an executable program is executed by at least one processor associated with the system and/or the device. In relation to systems and circuits, the term "operable" means the system and/or the circuit is fully functional and calibrated, comprises logic for, having the hardware and firmware necessary, as well as the circuitry for, and meets applicable operability requirements to perform a recited function when executed by at least one processor.

In addition, the computer program (software and/or firmware), can comprise program code means for carrying out the steps of the methods described herein, as well as a computer program product comprising program code means stored on a medium that can be read by a computer, such as a hard disk, CD-ROM, DVD, USB memory stick, or a storage medium that can be accessed via a data network, such as the Internet or Intranet, when the computer program product is loaded in the main memory of a computer and is carried out by the computer.

Memory device(s) as used in the methods described herein can be any of various types of non-volatile memory devices or storage devices (in other words, memory devices that do not lose the information thereon in the absence of power). The term "memory device" is intended to encompass an installation medium, e.g., a CD-ROM, floppy disks, or tape device or a non-volatile memory such as a magnetic media, e.g., a hard drive, optical storage, or ROM, EPROM, FLASH, etc. The memory device may comprise other types of memory as well, or combinations thereof. In addition, the memory medium may be located in a first computer in which the programs are executed, and/or may be located in a second different computer which connects to the first computer over a network, such as the Internet. In the latter instance, the second computer may further provide program instructions to the first computer for execution. The term "memory device" can also include two or more memory devices which may reside in different locations, e.g., in different computers that are connected over a network.

Additionally, the computer program used in the methods and systems provided, as a set of executable instructions, can be a set of instructions that can be used, directly or indirectly, in a computer. The systems and methods described herein can be implemented using programming languages such as Flash™, JAVA™, C++, C, C#, Visual Basic™, JavaScript™, PHP, XML, HTML, Solidity, etc., or a combination of programming languages, including compiled or interpreted languages, and can be deployed in any form, including as a stand-alone program or as a module, component, subroutine, or other unit suitable for use in a computing environment, including a virtual machine and/or virtual container. The software can include, but is not limited to, firmware, resident software, microcode, etc. Protocols such as SOAP/HTTP may be used in implementing interfaces between programming modules. The components and functionality described herein may be implemented on any desktop operating system executing in a virtualized or non-virtualized environment, using any programming language suitable for software development, including, but not limited to, different versions of Microsoft Windows™, Apple™ Mac™, IOS™, Unix™/X-Windows™, Linux™, etc. The system could be implemented using a web application framework, such as Ruby on Rails.

The term "computer-readable medium" as used herein, in addition to having its ordinary meaning, refers to any medium that participates in providing instructions to at least one processor for execution. Such a medium may take many forms, including but not limited to, non-volatile media and volatile media. Non-volatile media can be, for example, optical or magnetic disks, such as a storage device. Volatile media includes dynamic memory, such as main memory.

Further, the CPM may be operably coupled to the various modules and components with appropriate circuitry. may also be used herein, the term(s) "operably coupled to", "coupled to", and/or "coupling" includes direct coupling between items and/or indirect coupling between items via an intervening item (e.g., an item includes, but is not limited to, a component, an element, a circuit, an engine, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may also be used herein, the terms "central processing module", "module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributed (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the figures. Such a memory device or memory element can be included in an article of manufacture.

The user interface forming part of apparatus 100 can be interactive, referring in an exemplary implementation, to an interactive screen which comprises sensitive objects (points, objects, alphanumeric values, lists, menus, symbols, icons etc.) which are respectively associated with particular, specified functions; and which are sensitive to the presence of a cursor, or pressure or light differential as in touch screens (hereinafter, actuator). Furthermore, the systems used herein can be computerized systems further comprising a display module; and a user interface module. The Display modules, which can include display elements, which may include any type of element which acts as a display. A typical example is a Liquid Crystal Display (LCD). LCD for example, includes a transparent electrode plate arranged on each side of a liquid crystal. There are, however, many other forms of displays, for example OLED displays and Bi-stable displays. New display technologies are also being developed constantly. Therefore, the term display should be interpreted widely and should not be associated with a single display technology. Also, the display module may be mounted on a printed circuit board (PCB) of an electronic device, arranged within a protective housing and the display module is protected from damage by a glass or plastic plate arranged over the display element and attached to the housing.

In the context of the disclosure, the term "backend management server" (e.g., a host server), refer to a back-end hardware and software product that is used to manage content and communication and be accessed for example, when initiating communication between the user's computing devices 501$i$ (e.g., tablet, smartphone, phablets, or their combination), the backend management server can be configured to connect and retrieve requested data. "Content" (or "digital content" or "electronic content") refers generally to any and all types or formats of data or other information stored and/or transmitted electronically. Examples of content include, but are not limited to, a piece of software, a digital image, a piece of multimedia, flight control inputs, weather data, and the like. In an embodiment, the retrieved data can be pre-formulated ingredients associated with a particular use, such as health, low-glycemic index, no gluten, vegan and the like.

The term "coupled", including its various forms such as "operably coupling", "coupling" or "couplable", refers to and comprises any direct or indirect, structural coupling, connection or attachment, or adaptation or capability for such a direct or indirect structural or operational coupling, connection or attachment, including integrally formed components and components which are coupled via or through another component or by the forming process. Indirect coupling may involve coupling through an intermediary member or adhesive, or abutting and otherwise resting against, whether frictionally or by separate means without any physical connection.

"Combination" is inclusive of blends, mixtures, alloys, reaction products, and the like. Furthermore, the terms "first," "second," and the like, herein do not denote any order, quantity, or importance, but rather are used to denote one element from another.

The terms "a", "an" and "the" herein do not denote a limitation of quantity and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the facet(s) includes one or more facet).

Reference throughout the specification to "one exemplary implementation", "another exemplary implementation", "an exemplary implementation", and so forth, means that a particular element (e.g., feature, structure, and/or characteristic) described in connection with the exemplary implementation is included in at least one exemplary implementation described herein, and may or may not be present in other exemplary implementations. In addition, it is to be understood that the described elements may be combined in any suitable manner in the various exemplary implementations.

The term "selectably" as used when referring to the selectable heating and pressure profile based on the nature of the edible particulates, means the actuators and heating/cooling means are capable of being activated without affecting other components of the system.

The term "about", when used in the description of the technology and/or claims means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such and may include the end points of any range provided including, for example ±25%, or ±20%, specifically, ±15%, or ±10%, more specifically, ±5% of the indicated value of the disclosed amounts, sizes, formulations, parameters, and other quantities and characteristics.

One or more components may be referred to herein as "configured to," "configured by," "configurable to," "operable/operative to," "adapted/adaptable," "able to," "conformable/conformed to," etc. The terms (e.g., "configured to") can generally encompass active-state components and/or inactive-state components and/or standby-state components, unless context requires otherwise.

Furthermore, for the purposes of the present disclosure, directional or positional terms such as "top", "bottom", "upper," "lower," "side," "front," "frontal," "forward," "rear," "rearward," "back," "trailing," "above," "below," "left," "right," "horizontal," "vertical," "upward," "downward," "outer," "inner," "exterior," "interior," "intermediate," "posterior", "anterior", "apically", "basally" etc., are merely used for convenience in describing the various exemplary implementations, of the present invention.

Accordingly, and in an exemplary implementation, provided herein is a system for selecting and ordering a personalized, single-serve food bar formulation for a user comprising: a plurality of food bar formulations; a first inventory system comprising a plurality of cartridges, each cartridge corresponding to a food bar formulation; a second inventory system comprising a plurality of ingredients, configured when combined to form the personalized, single-serve food bar; a third inventory system comprising a plurality of third-party branded recipe cartridges, each cartridge corresponding to a predetermined food bar formulation; selecting at least one of: a custom-formulated food bar from the second inventory system, and a pre-formulated food bar from at least one of: the first inventory system, and the third inventory system; and ordering at least one of the selected food bars, further (i) comprising an apparatus, operable to form the personalized, single-serve food bar, (ii) the apparatus comprises: a housing having a front opening; a chamber within the housing, accessible through the front opening; a motorized lever, operable to reciprocally translate vertically at a predetermined rate; a chuck having a cavity sized and configured to accommodate a removable mold, operably coupled to the motorized lever, wherein the chuck is operable to be temperature programmable; the removable mold, having an open apical end, sized and adapted to accommodate the cartridge, or the ingredient combination; a motorized plunger, having a base plate, operable to reciprocally translate vertically at a predetermined rate, the base plate sized and configured to be accommodated in the open apical end of the removable mold, wherein the motorized plunger is operable to partially penetrate the removable mold to a predetermined depth: a motorized ejector, operable to reciprocally translate horizontally at a predetermined rate; a motor, in electric communication with the motorized lever, the motorized plunger and the motorized ejector; a user interface; receive a set of operating instructions from the user interface; and using the set operating instructions, actuating the motor to selectably control each of: the motorized lever, the motorized plunger, and the motorized ejector, wherein (iii) the base plate of the motorized plunger is operable to deliver liquid into the removable mold, and wherein the apparatus further comprises at least one liquid source, in fluid communication with the motorized plunger's base plate, wherein (iv) the liquid is steam, and/or (v) compressed gas, (vi) the apparatus further comprises: wherein (vii) a package of: each of the cartridges from the first inventory system, the plurality of ingredients' combination from the second inventory system, and each of the cartridges of the third inventory system comprises the set of operating instructions, wherein upon selection of the custom-formulated food bar, receive at least one ingredient combination; for the at least one ingredient combination, package the at least one ingredient combination, generate the set of operating instructions; and deliver the set of operating instructions; and using that set operating instructions, actuating the motor to selectably control each of the motorized lever, the motorized plunger, and the motorized ejector, (xi) the set of operating instructions comprises at least one of: a temperature profile to be programmed into the chuck, at least one of: the predetermined rate and period for upward translation of the motorized lever, the residence time at an apical position, and the predetermined rate and period for downward translation of the motorized lever, at least one of: the predetermined rate and period for downward translation of the motorized plunger, the residence time at a basal position, and the predetermined rate and period for upward translation of the motorized plunger, and at least one of: the predetermined rate and period for anterior translation of the motorized ejector, the residence time at a forward-most position, and the predetermined rate and period for posterior translation of the motorized ejector, wherein (xii) the motorized plunger's base plate further comprises a plurality of needles extending basally, configured to deliver the liquid and/or compressed gas, (xiii) the liquid source and/or gas source is operable to control the gas and/or liquid injection, and wherein the set of operating instructions further comprises the period for injecting the liquid and/or gas through the motorized plunger base plate into the removable mold.

Accordingly, and in an exemplary implementation, provided herein is a computerized networked system for selecting and ordering a personalized, single-serve food bar formulation for a user comprising: a backend networked management server (BNMS); a database comprising a plurality of food bar formulations in communication with the BNMS; a first inventory system comprising a plurality of cartridges, each cartridge corresponding to a food bar formulation in the database in communication with the BNMS; a second inventory system comprising a plurality of ingredients, configured when combined to form the personalized, single-serve food bar; a third inventory system comprising a plurality of third-party branded recipe cartridges, each cartridge corresponding to a predetermined food bar formulation in communication with the BNMS; a networked computing device, in communication with the BNMS, the networked computing device further comprising at least one processor operably coupled to a non-transitory memory device storing thereon a computer-readable medium with a set of executable instructions, configured when executed to cause the at least one processor to form the steps of: contacting the BNMS; selecting at least one of: a custom-formulated food bar from the second inventory system, and a pre-formulated food bar from at least one of: the first inventory system, and the third inventory system; and ordering at least one of the selected food bars, further (i) comprising an apparatus, operable to form the personalized, single-serve food bar, (ii) the apparatus comprises: a housing having a front opening; a chamber within the housing, accessible through the front opening; a motorized lever, operable to reciprocally translate vertically at a predetermined rate; a chuck having a cavity sized and configured to accommodate a removable mold, operably coupled to the motorized lever, wherein the chuck is operable to be temperature programmable; the removable mold, having an open apical end, sized and adapted to accommodate the cartridge, or the ingredient combination; a motorized plunger, having a base plate, operable to reciprocally translate vertically at a predetermined rate, the base plate sized and configured to be accommodated in the open apical end of the removable mold, wherein the motorized plunger is operable to partially penetrate the removable mold to a predetermined depth; a motorized ejector, operable to reciprocally translate horizontally at a predetermined rate; a motor, in electric communication with the motorized lever, the motorized plunger and the motorized ejector; a user interface; and a central processing module (CPM) in communication with the user interface, the chuck, and the motor, the CPM further comprising at least one processor operably coupled to a non-transitory memory device storing thereon a computer-readable medium with a set of executable instructions, configured when executed to cause the at least one processor to: receive a set of operating instructions from the user interface; and using the set operating instructions, actuating the motor to selectably control each of: the motorized lever, the motorized plunger, and the motorized ejector, wherein (iii) the base plate of the motorized plunger is operable to deliver liquid into the removable mold, and wherein the apparatus further comprises at least one liquid source, in fluid communication with the motorized plunger's base plate, wherein (iv) the liquid is steam, and/or (v) compressed gas, (vi) the apparatus further comprises: a networked communication module, in communication with the BNMS and the CPM, wherein (vii) a package of: each of the cartridges from the first inventory system, the plurality of ingredients' combination from the second inventory system, and each of the cartridges of the third inventory system comprises the set of operating instructions, wherein (viii) the set of operating instructions are encoded in a readable format, and wherein the user interface further comprises a code reader, operable to load the set of operating instruction to the CPM, wherein (ix) the BNMS further comprising at least one processor operably coupled to a non-transitory memory device storing thereon a computer-readable medium with a set of executable instructions, configured when executed to cause the at least one processor to: upon selection of the custom-formulated food bar by the networked computing device, provide to the networked computing device a list of ingredients; receive from the networked computing device at least one ingredient combination; for the at least one ingredient combination, package the at least one ingredient combination, generate the set of operating instructions; and deliver the set of operating instructions to at least one of: the communication module of the apparatus, and the networked computing device, wherein (x) the set of executable instructions stored in the non-transitory memory device operably coupled to the at least one processor included with the apparatus CPM, are further configured, when executed to cause the at least one microprocessor to: receive the set of operating instructions from the BNMS; and using that set operating instructions, actuating the motor to selectably control each of: the motorized lever, the motorized plunger, and the motorized ejector, (xi) the set of operating instructions comprises at least one of: a temperature profile to be programmed into the chuck, at least one of: the predetermined rate and period for upward translation of the motorized lever, the residence time at an apical position, and the predetermined rate and period for downward translation of the motorized lever, at least one of: the predetermined rate and period for downward translation of the motorized plunger, the residence time at a basal position, and the predetermined rate and period for upward translation of the motorized plunger, and at least one of: the predetermined rate and period for anterior translation of the motorized ejector, the residence time at a forward-most position, and the predetermined rate and period for posterior translation of the motorized ejector, wherein (xii) the motorized plunger's base plate further comprises a plurality of needles extending basally, configured to deliver the liquid and/or compressed gas, (xiii) the liquid source and/or gas source is in communication with the CPM and is operable to control the gas and/or liquid injection, and wherein the set of operating instructions further comprises the period for injecting the liquid and/or gas through the motorized plunger base plate into the removable mold.

In another exemplary implementation, provided herein is a method of selecting, ordering and forming a personalized, single-serve food bar, implementable in the system disclosed herein, the method comprising: selecting a food bar from at least one of: the cartridges from the first inventory system, the plurality of ingredients' combination from the second inventory system, and the cartridges of the third inventory system; ordering the food bar: upon receipt, placing one of: the cartridges from the first inventory system, the ingredients' combination from the second inventory system, or the cartridges of the third inventory system into the removable mold; and using the operating instructions provided with the cartridges from the first inventory system, the ingredients' combination from the second inventory system, or the cartridges of the third inventory system, forming the personalized, single-serve food bar.

In another exemplary implementation, provided herein is a computerized method of selecting, ordering and forming a personalized, single-serve food bar, implementable in the computerized networked systems disclosed herein, the method comprising: using the networked computing device contacting the BNMS; accessing the database in communication with the BNMS, using the database, selecting a food bar from at least one of: the cartridges from the first inventory system, the plurality of ingredients' combination from the second inventory system, and the cartridges of the third inventory system; ordering the food bar; upon receipt, placing one of: the cartridges from the first inventory system, the ingredients' combination from the second inventory system, or the cartridges of the third inventory system into the removable mold; and using the operating instructions provided with the cartridges from the first inventory system, the ingredients' combination from the second inventory system, or the cartridges of the third inventory system, forming the personalized, single-serve food bar.

In yet another exemplary implementation, provided herein is a system for selecting and ordering a personalized, single-serve food bar formulation for a user comprising: a plurality of food bar formulations; a first inventory system comprising a plurality of cartridges, each cartridge corresponding to a food bar formulation; selecting at least one food bar formulation ordering at least one of the selected food bars formulation, further (xiv) comprising an apparatus, operable to form the personalized, single-serve food bar, the apparatus comprising: a housing having a front opening; a chamber within the housing, accessible through the front opening; a motorized lever, operable to reciprocally translate vertically at a predetermined rate; a chuck having a cavity sized and configured to accommodate a removable mold, operably coupled to the motorized lever, wherein the chuck is operable to be temperature programmable: the removable mold, having an open apical end, sized and adapted to accommodate the cartridge, or the ingredient combination; a motorized plunger, having a base plate, operable to reciprocally translate vertically at a predetermined rate, the base plate sized and configured to be accommodated in the open apical end of the removable mold, wherein the motorized plunger is operable to partially penetrate the removable mold to a predetermined depth; a motorized ejector, operable to reciprocally translate horizontally at a predetermined rate, a motor, in electric communication with the motorized lever, the motorized plunger and the motorized ejector; a user interface; the chuck and the motor, receive a set of operating instructions from the user interface; and using the set operating instructions, actuating the motor to selectably control each of: the motorized lever, the motorized plunger, and the motorized ejector to form the personalized, single-serve food bar, wherein (xv) the base plate of the motorized plunger is operable to deliver at least one of: a liquid, and a compressed gas, into the removable mold, and wherein the apparatus further comprises at least one liquid source, in fluid communication with the motorized plunger's base plate, wherein (xvi) the set of operating instructions comprises at least one of: a temperature profile to be programmed into the chuck, at least one of: the predetermined rate and period for upward translation of the motorized lever, the residence time at an apical position, and the predetermined rate and period for downward translation of the motorized lever, at least one of: the predetermined rate and period for downward translation of the motorized plunger, the residence time at a basal position, and the predetermined rate and period for upward translation of the motorized plunger, and at least one of: the predetermined rate and period for anterior translation of the motorized ejector, the residence time at a forward-most position, and the predetermined rate and period for posterior translation of the motorized ejector, and wherein (xvii) a liquid and/or compressed gas source included with the apparatus; controlling the injection of the liquid and/or the compressed gas, and wherein the set of operating instructions further comprises the period for injecting the liquid and/or the compressed gas through the motorized plunger base plate into the removable mold.

In yet another exemplary implementation, provided herein is a computerized networked system for selecting and ordering a personalized, single-serve food bar formulation for a user comprising: a backend networked management server (BNMS); a database comprising a plurality of food bar formulations in communication with the BNMS; a first inventory system comprising a plurality of cartridges, each cartridge corresponding to a food bar formulation in the database in communication with the BNMS; a networked computing device, in communication with the BNMS, the networked computing device further comprising at least one processor operably coupled to a non-transitory memory device storing thereon a computer-readable medium with a set of executable instructions, configured when executed to cause the at least one processor to form the steps of: contacting the BNMS; selecting at least one food bar formulation ordering at least one of the selected food bars formulation, further (xiv) comprising an apparatus, operable to form the personalized, single-serve food bar, the apparatus comprising: a housing having a front opening; a chamber within the housing, accessible through the front opening: a motorized lever, operable to reciprocally translate vertically at a predetermined rate; a chuck having a cavity sized and configured to accommodate a removable mold, operably coupled to the motorized lever, wherein the chuck is operable to be temperature programmable; the removable mold, having an open apical end, sized and adapted to accommodate the cartridge, or the ingredient combination; a motorized plunger, having a base plate, operable to reciprocally translate vertically at a predetermined rate, the base plate sized and configured to be accommodated in the open apical end of the removable mold, wherein the motorized plunger is operable to partially penetrate the removable mold to a predetermined depth; a motorized ejector, operable to reciprocally translate horizontally at a predetermined rate; a motor, in electric communication with the motorized lever, the motorized plunger and the motorized ejector; a user interface; a networked communication module, in communication with the BNMS and a central processing module (CPM); and the CPM in communication with the user interface, the chuck, and the motor, the CPM further comprising at least one processor operably coupled to a non-transitory memory device storing thereon a computer-readable medium with a set of executable instructions, configured when executed to cause the at least one processor to: receive a set of operating instructions from the user interface; and using the set operating instructions, actuating the motor to selectably control each of: the motorized lever, the motorized plunger, and the motorized ejector to form the personalized, single-serve food bar, wherein (xv) the base plate of the motorized plunger is operable to deliver at least one of: a liquid, and a compressed gas, into the removable mold, and wherein the apparatus further comprises at least one liquid source, in fluid communication with the motorized plunger's base plate, wherein (xvi) the set of operating instructions comprises at least one of: a temperature profile to be programmed into the chuck, at least one of: the predetermined rate and period for upward translation of the motorized lever, the residence time at an apical position, and the predetermined rate and period for downward translation of the motorized lever, at least one of: the predetermined rate and period for downward translation of the motorized plunger, the residence time at a basal position, and the predetermined rate and period for upward translation of the motorized plunger, and at least one of: the predetermined rate and period for anterior translation of the motorized ejector, the residence time at a forward-most position, and the predetermined rate and period for posterior translation of the motorized ejector, and wherein (xvii) a liquid and/or compressed gas source included with the apparatus is in communication with the CPM, the CPM operable to control the injection of the liquid and/or the compressed gas, and wherein the set of operating instructions further comprises the period for injecting the liquid and/or the compressed gas through the motorized plunger base plate into the removable mold.

While particular exemplary implementations of the system and methods of producing on-demand, personalized, single-serve food bars in a relatively short timeframe have been described, alternatives, modifications, variations, improvements, and substantial equivalents that are or may be presently unforeseen may arise to applicants or others skilled in the art. Accordingly, the appended claims as filed and as they may be amended, are intended to embrace all such alternatives, modifications variations, improvements, and substantial equivalents.

What is claimed is:

1. A computerized networked system for selecting and ordering a personalized, single-serve food bar formulation for a user comprising:
   a) a backend networked management server (BNMS);
   b) a database comprising a plurality of food bar formulations in communication with the BNMS;
   c) a first inventory system comprising a plurality of cartridges, each cartridge corresponding to a food bar formulation in the database in communication with the BNMS;
   d) a second inventory system comprising a plurality of ingredients, configured when combined to form the personalized, single-serve food bar;
   e) a third inventory system comprising a plurality of third-party branded recipe cartridges, each cartridge corresponding to a predetermined food bar formulation in communication with the BNMS;
   f) a networked computing device, in communication with the BNMS, the networked computing device further comprising at least one processor operably coupled to a non-transitory memory device storing thereon a computer-readable medium with a set of executable instructions, configured when executed to cause the at least one processor to form the steps of:
      i. contacting the BNMS;
      ii. selecting at least one of: a custom-formulated food bar from the second inventory system, and a pre-formulated food bar from at least one of: the first inventory system, and the third inventory system; and
      iii. ordering at least one of the selected food bars;
   g) an apparatus, operable to form the personalized, single-serve food bar, wherein the apparatus includes:
      a) a housing having a front opening;
      b) a chamber within the housing, accessible through the front opening;
      c) a motorized lever, operable to reciprocally translate vertically at a predetermined rate;
      d) a chuck having a cavity sized and configured to accommodate a removable mold, operably coupled to the motorized lever, wherein the chuck is operable to be temperature programmable;
      e) the removable mold, having an open apical end, sized and adapted to accommodate the cartridge, or the ingredient combination;
      f) a motorized plunger, having a base plate, operable to reciprocally translate vertically at a predetermined rate, the base plate sized and configured to be accommodated in the open apical end of the removable mold, wherein the motorized plunger is operable to partially penetrate the removable mold to a predetermined depth;
      g) a motorized ejector, operable to reciprocally translate horizontally at a predetermined rate;
      h) a motor, in electric communication with the motorized lever, the motorized plunger and the motorized ejector;
      i) a user interface; and
      j) a central processing module (CPM) in communication with the user interface, the chuck, and the motor, the CPM further comprising at least one processor operably coupled to a non-transitory memory device storing thereon a computer-readable medium with a set of executable instructions, configured when executed to cause the at least one processor to:
         i. receive a set of operating instructions from the user interface; and
         ii. using the set operating instructions, actuating the motor to selectably control each of: the motorized lever, the motorized plunger, and the motorized ejector.

2. The computerized networked system of claim 1, wherein the base plate of the motorized plunger is operable to deliver liquid into the removable mold, and wherein the apparatus further comprises at least one liquid source, in fluid communication with the motorized plunger's base plate.

3. The computerized networked system of claim 2, wherein the liquid is steam.

4. The computerized networked system of claim 2, wherein the liquid is compressed gas.

5. The computerized networked system of claim 2, wherein the apparatus further comprises: a networked communication module, in communication with the BNMS and the CPM.

6. The computerized networked system of claim 1, wherein a package of: each of the cartridges from the first inventory system, the plurality of ingredients' combination from the second inventory system, and each of the cartridges of the third inventory system comprises the set of operating instructions.

7. The computerized networked system of claim 6, wherein the set of operating instructions are encoded in a readable format, and wherein the user interface further comprises a code reader, operable to load the set of operating instruction to the CPM.

8. The computerized networked system of claim 5, wherein the BNMS further comprising at least one processor operably coupled to a non-transitory memory device storing thereon a computer-readable medium with a set of executable instructions, configured when executed to cause the at least one processor to:

a) upon selection of the custom-formulated food bar by the networked computing device, provide to the networked computing device a list of ingredients;
b) receive from the networked computing device at least one ingredient combination;
c) for the at least one ingredient combination, package the at least one ingredient combination, generate the set of operating instructions; and
d) deliver the set of operating instructions to at least one of: the communication module of the apparatus, and the networked computing device.

9. The computerized networked system of claim 8, wherein the set of executable instructions stored in the non-transitory memory device operably coupled to the at least one processor included with the apparatus CPM, are further configured, when executed to cause the at least one microprocessor to:
a) receive the set of operating instructions from the BNMS; and
b) using that set operating instructions, actuating the motor to selectably control each of: the motorized lever, the motorized plunger, and the motorized ejector.

10. The computerized networked system of claim 1, wherein the set of operating instructions comprises at least one of:
a) a temperature profile to be programmed into the chuck,
b) at least one of: the predetermined rate and period for upward translation of the motorized lever, the residence time at an apical position, and the predetermined rate and period for downward translation of the motorized lever,
c) at least one of: the predetermined rate and period for downward translation of the motorized plunger, the residence time at a basal position, and the predetermined rate and period for upward translation of the motorized plunger, and
d) at least one of: the predetermined rate and period for anterior translation of the motorized ejector, the residence time at a forward-most position, and the predetermined rate and period for posterior translation of the motorized ejector.

11. The computerized networked system of claim 2, wherein the motorized plunger's base plate further comprises a plurality of needles extending basally, configured to deliver the liquid.

12. The computerized networked system of claim 11, wherein the liquid source is in communication with the CPM, and wherein the set of operating instructions further comprises the period for injecting the liquid through the motorized plunger base plate into the removable mold.

13. A computerized method of selecting, ordering and forming a personalized, single-serve food bar, implementable in the computerized networked system of claim 1, the method comprising:
a) using the networked computing device contacting the BNMS;
b) accessing the database in communication with the BNMS,
c) using the database, selecting a food bar from at least one of: the cartridges from the first inventory system, the plurality of ingredients' combination from the second inventory system, and the cartridges of the third inventory system;
d) using an apparatus operable to form a personalized single-serve food bar, wherein the apparatus includes, a housing having a front opening;
a chamber within the housing, accessible through the front opening;
a motorized lever, operable to reciprocally translate vertically at a predetermined rate;
a chuck having a cavity sized and configured to accommodate a removable mold, operably coupled to the motorized lever, wherein the chuck is operable to be temperature programmable;
the removable mold, having an open apical end, sized and adapted to accommodate the cartridge, or the ingredient combination;
a motorized plunger, having a base plate, operable to reciprocally translate vertically at a predetermined rate, the base plate sized and configured to be accommodated in the open apical end of the removable mold, wherein the motorized plunger is operable to partially penetrate the removable mold to a predetermined depth;
a motorized ejector, operable to reciprocally translate horizontally at a predetermined rate;
a motor, in electric communication with the motorized lever, the motorized plunger and the motorized ejector;
a user interface; and
a central processing module (CPM) in communication with the user interface, the chuck, and the motor, the CPM further comprising at least one processor operably coupled to a non-transitory memory device storing thereon a computer-readable medium with a set of executable instructions, configured when executed to cause the at least one processor to:
i. receive a set of operating instructions from the user interface; and
ii. using the set operating instructions, actuating the motor to selectably control each of the motorized lever, the motorized plunger and the motorized ejector,
e) ordering the food bar;
f) upon receipt, placing one of: the cartridges from the first inventory system, the ingredients' combination from the second inventory system, or the cartridges of the third inventory system into the removable mold; and
g) using the operating instructions provided with the cartridges from the first inventory system, the ingredients' combination from the second inventory system, or the cartridges of the third inventory system, forming the personalized, single-serve food bar, wherein the forming the personalized, single-serve food bar includes causing at least one processor of the CPM of the computerized network system to receive the operating instructions and actuate the motor to selectably control each of the motorized lever, the motorized plunger, and the motorized ejector.

14. A computerized networked system for selecting and ordering a personalized, single-serve food bar formulation for a user comprising:
a) a backend networked management server (BNMS);
b) a database comprising a plurality of food bar formulations in communication with the BNMS;
c) a first inventory system comprising a plurality of cartridges, each cartridge corresponding to a food bar formulation in the database in communication with the BNMS;
d) a networked computing device, in communication with the BNMS, the networked computing device further comprising at least one processor operably coupled to a non-transitory memory device storing thereon a computer-readable medium with a set of executable instructions, configured when executed to cause the at least one processor to form the steps of:
  i. contacting the BNMS;
  ii. selecting at least one food bar formulation
  iii. ordering at least one of the selected food bars formulation; and
e) an apparatus, operable to form the personalized, single-serve food bar, the apparatus including:
  a) a housing having a front opening;
  b) a chamber within the housing, accessible through the front opening;
  c) a motorized lever, operable to reciprocally translate vertically at a predetermined rate;
  d) a chuck having a cavity sized and configured to accommodate a removable mold, operably coupled to the motorized lever, wherein the chuck is operable to be temperature programmable;
  e) the removable mold, having an open apical end, sized and adapted to accommodate the cartridge, or the ingredient combination;
  f) a motorized plunger, having a base plate, operable to reciprocally translate vertically at a predetermined rate, the base plate sized and configured to be accommodated in the open apical end of the removable mold, wherein the motorized plunger is operable to partially penetrate the removable mold to a predetermined depth;
  g) a motorized ejector, operable to reciprocally translate horizontally at a predetermined rate;
  h) a motor, in electric communication with the motorized lever, the motorized plunger and the motorized ejector;
  i) a user interface;
  j) a networked communication module, in communication with the BNMS and a central processing module (CPM); and
  k) the CPM in communication with the user interface, the chuck, and the motor, the CPM further comprising at least one processor operably coupled to a non-transitory memory device storing thereon a computer-readable medium with a set of executable instructions, configured when executed to cause the at least one processor to:
    i. receive a set of operating instructions from the user interface; and
    ii. using the set operating instructions, actuating the motor to selectably control each of: the motorized lever, the motorized plunger, and the motorized ejector to form the personalized, single-serve food bar.

15. The computerized networked system of claim 14, wherein the base plate of the motorized plunger is operable to deliver at least one of: a liquid, and a compressed gas, into the removable mold, and wherein the apparatus further comprises at least one liquid source, in fluid communication with the motorized plunger's base plate.

16. The computerized networked system of claim 15, wherein the set of operating instructions comprises at least one of:
  a) a temperature profile to be programmed into the chuck,
  b) at least one of: the predetermined rate and period for upward translation of the motorized lever, the residence time at an apical position, and the predetermined rate and period for downward translation of the motorized lever,
  c) at least one of: the predetermined rate and period for downward translation of the motorized plunger, the residence time at a basal position, and the predetermined rate and period for upward translation of the motorized plunger, and
  d) at least one of: the predetermined rate and period for anterior translation of the motorized ejector, the residence time at a forward-most position, and the predetermined rate and period for posterior translation of the motorized ejector.

17. The computerized networked system of claim 16, wherein a liquid source included with the apparatus is in communication with the CPM, and wherein the set of operating instructions further comprises the period for injecting the liquid through the motorized plunger base plate into the removable mold.

* * * * *